No. 862,267.

PATENTED AUG. 6, 1907.

A. F. MEYER.
ROAD VEHICLE.
APPLICATION FILED JAN. 2, 1906.

2 SHEETS—SHEET 1.

Witnesses
Frederick Cleveland
Samuel Percival

Inventor
August F. Meyer
By his attorneys
Wheatley & Mackenzie

No. 862,267. PATENTED AUG. 6, 1907.
A. F. MEYER.
ROAD VEHICLE.
APPLICATION FILED JAN. 2, 1906.

2 SHEETS—SHEET 2.

Witnesses.
Fredrick Cleveland.
Samuel Percival.

Inventor:
August F. Meyer
By his attorneys
Wheatley & MacKenzie

UNITED STATES PATENT OFFICE.

AUGUST FRIEDRICH MEYER, OF BREMEN, GERMANY.

ROAD-VEHICLE.

No. 862,267.  Specification of Letters Patent.  Patented Aug. 6, 1907.

Application filed January 2, 1906. Serial No. 294,281.

*To all whom it may concern:*

Be it known that AUGUST FRIEDRICH MEYER, a subject of the German Emperor, residing at 3 Hornerstrasse, Bremen, Germany, has invented certain new and useful Improvements in Road-Vehicles; and he does hereby declare the following to be a full, clear, and exact description of the invention, such as will enable others skilled in the art to which it appertains to make and use the same.

This invention relates to road vehicles and has for its object to prevent the swaying of the poles of such vehicles which at present occurs when running over uneven roads causing inconvenience and sometimes suffering to the animals drawing the vehicle.

Figure 3:
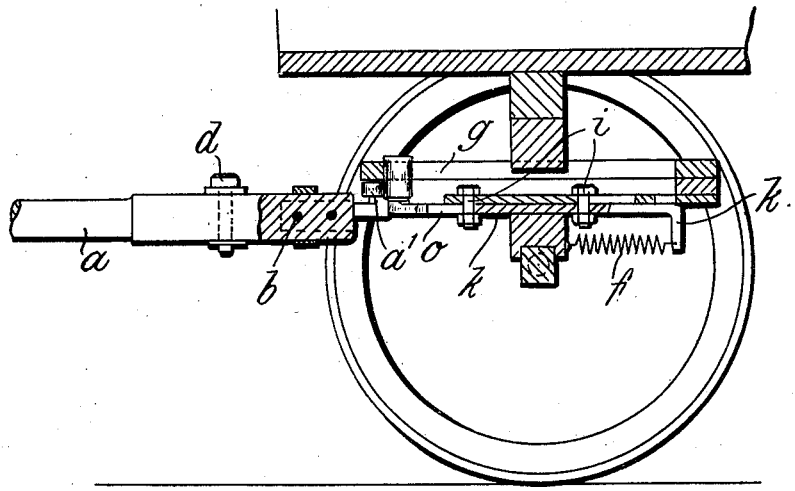
Figure 4:
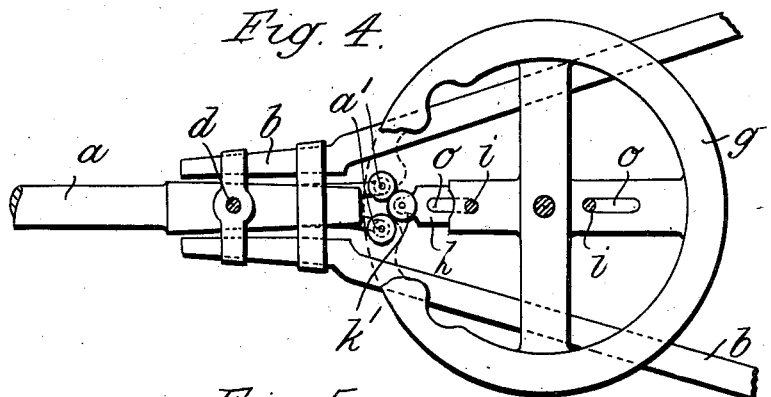

The lateral deviations of the vehicle and the lateral movements of the pole occur in the ordinary four-wheel horse vehicles owing to the front wheel axle which is connected with the pole being rotatively connected with the body of the vehicle and this connection is always so effected that the under-carriage can turn to right or left without hindrance so that on meeting an obstruction either of the wheels connected with the front axle causes the axle to turn and the vehicle is either diverted from the direction in which it was traveling or the draft animals receive a shock. For the purpose of avoiding the unreliable traveling thus caused and to relieve the draft animals as far as possible, the device employed for guiding the vehicle, and forming the subject of this invention, is so constructed that when the vehicle is running straight the under-frame is firmly coupled with the upper part of the vehicle, and the coupling can only be disengaged by the pole itself. Two examples of this coupling device are shown in the accompanying drawing, Figures 1 and 2 being respectively a longitudinal section and a plan of one form of coupling; Figs. 3 and 4 a longitudinal section and a plan respectively of a modified form of the device; and Fig. 5 a partial plan of the latter form of the device as it appears at the moment when the uncoupling is effected.

Figure 1:
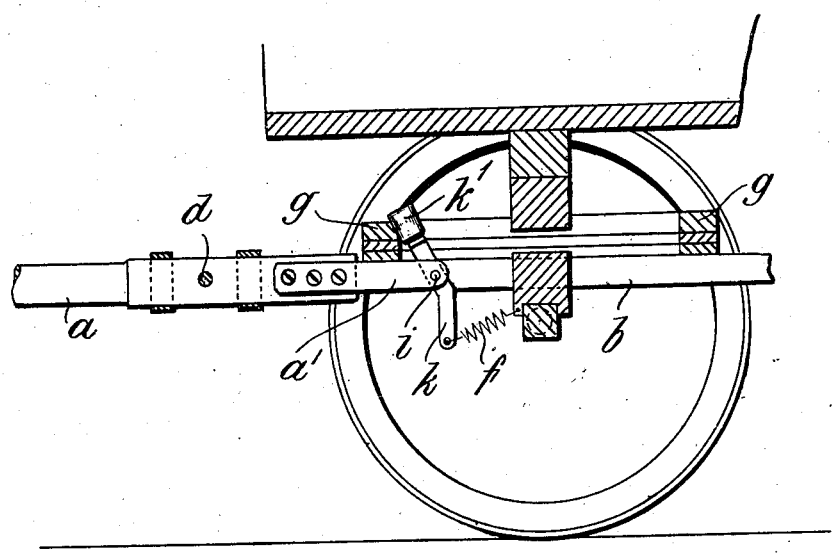
Figure 2:
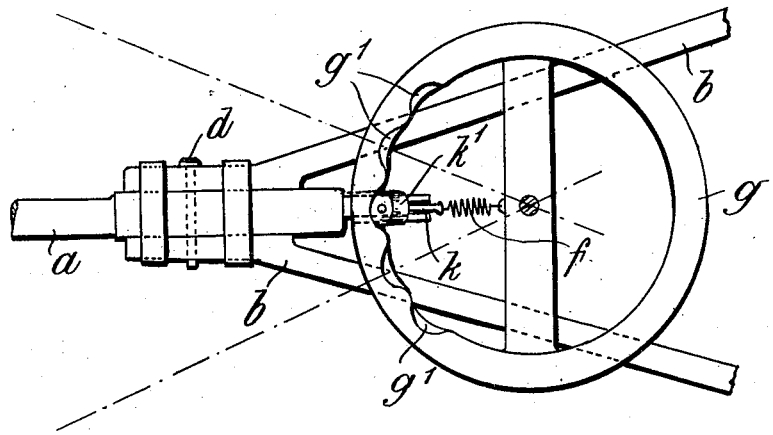

Referring to Figs. 1 and 2 the pole $a$ is mounted in the thills $b$ on the pin $d$ and is provided at the back end with an extension $a'$. With this extension an obliquely held lever $k$ which fulcrums around the pin $i$ is connected. The upper end of the lever $k$ is furnished with a roller $k'$, while its lower end has a spring $f$ attached thereto which presses the roller on the upper end against the inner edge of the ring or frame $g$ which is formed with obliquely cut notches $g'$ and connected with the body framing.

If the vehicle is turned by the draft animal that is by means of the pole $a$ the uncoupling is effected, the roller $k'$ being forced out of a notch $g'$ and catching in another without appreciable expenditure of power, in consequence of the long lever arm of the pole. If, on the other hand, any obstacle occurs, in the way of the front wheels, the turning with the short lever arm the half front axle, requires a far greater power in order to direct the course of the vehicle that is to force the roller lever out of its notch. If this however happens notwithstanding when turning against a greater resistance a coupling is again immediately effected the roller catching in the nearest notch, so that the latest movement of the pole is only very slight and does not injuriously affect the draft animal.

Figure 5:
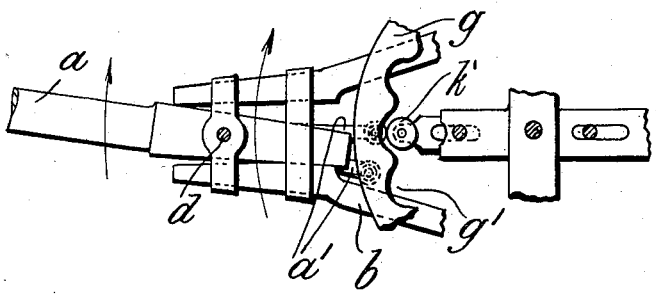

Figs. 3 to 5 represent a form of the device in which the pole $a$ which moves horizontally around the pin $d$ carries at the back end on a fork-shaped extension two rollers $a'$, between which a roller $k'$ arranged on the slide $k$ is held tightly against the pole. This slide $k$ is pressed by a spring $f$ into engagement with the rollers $a'$ but its motion is limited by pins $i$ working in slots $o$ in the slide.

The lateral movement of the pole is limited by the thills $b$. By this movement the slide $k$, as shown in Fig. 5, is forced with its roller $k'$ out of the rollers $a'$, but is again pressed in between the rollers $a'$ and one of the notches $g'$ formed in the rotary ring $g$ when the pole is returned to the central position.

What he claims as his invention and desires to secure by Letters Patent is:—

In a road vehicle the combination with the under-frame and the pole, of a coupling consisting of a lever fulcrumed on the rear end of the pole, a roller on the upper end of the lever a spring attached to its lower end and adapted to force the upper end forward and serrations on a fixed part of the under-frame arranged to engage with the roller to hold the pole in definite positions relatively to the under frame.

In testimony whereof he has affixed his signature, in presence of two witnesses.

AUGUST FRIEDRICH MEYER.

Witnesses:
C. DIEDERICH,
J. REICH.